Jan. 23, 1940.   A. B. HURLEY   2,187,904
LIGHT-REFLECTING AND SOUND-TRANSMITTING MOTION PICTURE APPARATUS
Filed May 27, 1936
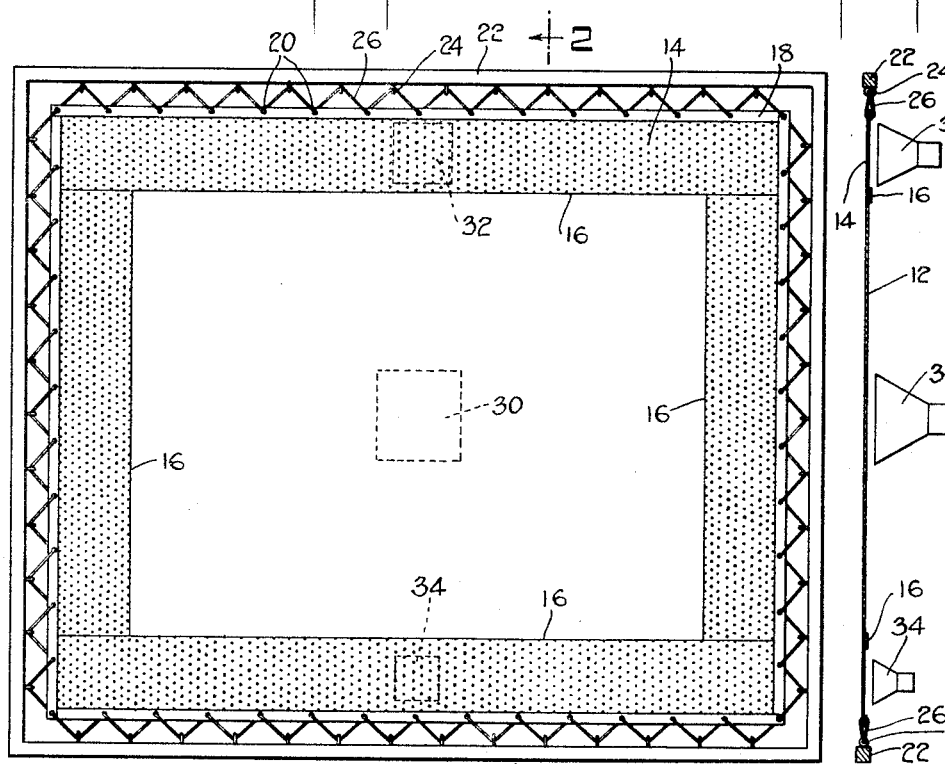
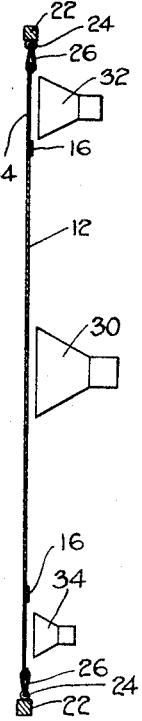
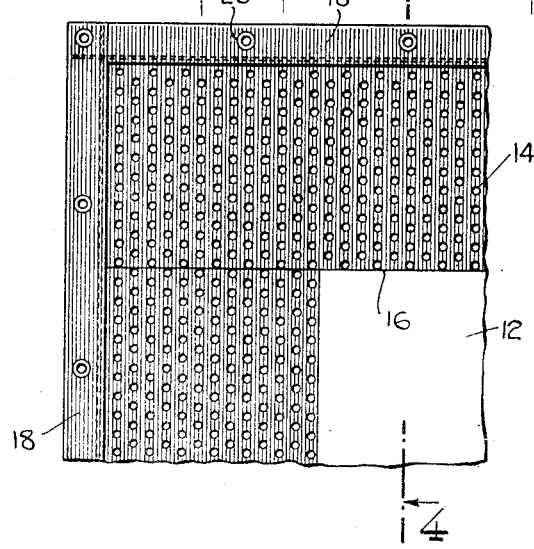
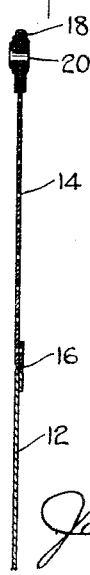
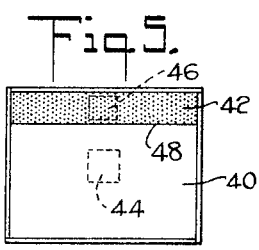
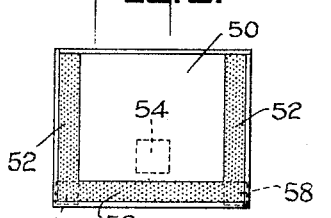
INVENTOR
Albert B. Hurley
BY James & Franklin
ATTORNEYS Patented Jan. 23, 1940

2,187,904

UNITED STATES PATENT OFFICE 2,187,904

LIGHT-REFLECTING AND SOUND-TRANSMITTING MOTION PICTURE APPARATUS

Albert B. Hurley, Huntington, N. Y.

Application May 27, 1936, Serial No. 81,985

2 Claims. (Cl. 88—24)

This invention relates to sound motion picture apparatus, and more particularly to a light-reflecting and sound-transmitting screen for motion picture use.

Screens for sound motion pictures are ordinarily made of a light-reflecting fabric which is perforated to facilitate the passage of sound therethrough. These perforations are troublesome because they decrease the light-reflecting area and decrease the strength of the material, in addition to which they collect dust which tends to make the screen dirty. In extreme cases the orifices, which must be kept small, may become clogged. The primary object of my invention is to generally improve sound motion picture screens, and to avoid these defects.

More particular objects are to improve the light reflection from the screen and to increase the strength of the material of the screen, which I do by entirely eliminating the use of perforations in the light-reflecting area of the screen.

Another object of my invention is to improve the sound transmission properties of the screen, and to this end I employ special sections of the screen, preferably marginal or border sections located outside the light-reflecting part of the screen, the border sections preferably being made black or light-absorbing and being provided with a suitable percentage area of relatively large-diameter holes which are highly effective for the transmission of sound, particularly the higher frequency components thereof. The special sound-transmitting sections may be and preferably are employed also as a mask immediately surrounding the light-reflecting part of the screen.

In order to obtain good sound reproduction, it has been found desirable to use a plurality of speakers which are distributed over the area of the screen. For example, in the so-called "three-way system" it is customary to employ three speakers which are intended predominantly for the production of low, intermediate, and high frequencies, respectively. These speakers are spaced or spread apart, one being located at the center of the screen and the others remote therefrom, for example at the top and bottom of the screen. In accordance with a further feature and object of my invention, the most desirable relative location of the speakers may be retained while using the imperforate light-reflecting and perforated non-reflecting screen sections heretofore described. I have discovered that while perforations are essential for proper transmission of the higher frequencies, they are not at all essential for effective transmission of the low frequencies. I therefore associate with my improved screen a plurality of speakers one of which, that intended for the production of low frequency tones, is located in back of the imperforate light-reflecting portion of the screen, while one or more additional speakers, intended for the production of higher frequency tones are located behind the perforated mask portions of the screen.

To the accomplishment of the foregoing and such other objects as will hereinafter appear, my invention consists in the light-reflecting and sound-transmitting screen elements and their relation one to the other, as are hereinafter more particularly described in the specification and sought to be defined in the claims. The specification is accompanied by a drawing in which:

Fig. 1 is a front elevation of a screen embodying features of my invention;

Fig. 2 is a section taken in the plane of the line 2—2 of Fig. 1;

Fig. 3 is an enlarged showing of one corner of the screen;

Fig. 4 is a section taken in the plane of the line 4—4 of Fig. 3;

Fig. 5 is a front elevation of a modified form of screen embodying features of my invention; and Fig. 6 shows still another modification.

Referring to the drawing and more particularly to Figs. 1 through 4, my invention as there exemplified comprises an imperforate light-reflecting area or screen 12 surrounded by a light-absorbent mask 14. The area 12 is preferably made of white fabric, while the border or mask portions 14 are preferably made of black fabric. These parts are stitched together along seam lines 16 to form a continuous fabric screen. The edge of the screen is reinforced by a suitable tape 18 and has spaced eyelets 20 therethrough. The screen is supported within a suitable rigid frame 22 provided with spaced eyes 24. A cord or lacing 26 is threaded through the eyes 24 and the eyelets 20 and drawn tight in order to stretch the screen tautly within the frame.

The sound reproducing system here illustrated is the so-called "three-way system", that is, it employs three loud speakers predominantly intended for the reproduction of high, intermediate, and low frequency tones, respectively. For best results, these speakers should be spaced well apart in back of the screen. In the present case, one speaker is located at the top of the screen, another at the center, and another at the bottom of the screen.

I have discovered that while the perforations customarily employed for sound transmission through the screen are essential for the higher frequency tones, they are not at all necessary for low frequency tones. In fact, the low frequency tones may be effectively transmitted through an imperforate and even a non-porous screen. In accordance with my invention, therefore, the loud speaker 30, intended for the reproduction of low frequency tones, is located in back of the imperforate light-reflecting screen 12. The loud speakers 32 and 34, however, intended predominantly for the reproduction of intermediate and high frequency tones, are located in back of the non-reflecting perforated mask 14.

With this arrangement, there is no loss of light-reflecting property of the screen by reason of perforations therethrough, and instead the perforations are confined to the non-reflecting or mask portion of the screen which is anyway intended to be light-absorbent. Because of this fact, the percentage area of perforation need not be closely limited, and I have employed from 12 to 15% area of perforation, whereas when the perforations are provided in the light-reflecting portion of the screen, it has heretofore been considered necessary to limit the area of perforation to a maximum of 9%. Moreover, I have found it readily possible to increase the diameter of the perforations from fifty-thousandths of an inch to from sixty-two to seventy-eight thousandths of an inch, thus increasing the efficiency of sound transmission through the screen. Of course, any absorption or loading of the perforation with dust or dirt is of no serious consequence because there is no dirtying of the white or light-reflecting part of the screen.

There ordinarily is no loss of area or increase in dimension of the screen, because it is anyway customary to in most cases mask the screen by a surrounding border or mask of one kind or another. However, it will be understood that where limitation of dimension is important, or where for some other reason it is not thought necessary to mask the screen, the perforated area may be limited. Thus, referring to Fig. 5, I show a screen having a light-reflecting portion 40 with a perforated non-reflecting section 42 disposed at one edge only of the area 40. In this case the sound system is the so-called "two-way system" employing only two loudspeakers. One of these, the speaker 44, is intended predominantly for the production of low frequency tones, and this speaker is located in back of the imperforate screen 40. The other speaker 46 is intended predominantly for the reproduction of high frequency tones and is located in back of the perforated marginal section 42 of the screen. It will be understood that the sections 40 and 42 are joined by a suitable seam 48 which, like the seams 16 previously referred to, in no way interferes with the distribution of sound over the back of the screen.

In the arrangement of Fig. 6, the light-reflecting imperforate screen section 50 is surrounded on three sides by black perforated mask sections 52. Three speakers are employed, the speaker 54, intended predominantly for the reproduction of low frequency tones, being located directly in back of the imperforate screen section 50, while the speakers 56 and 58, intended for the reproduction of medium and high frequency tones, are located at the corners of the screen in back of the perforated border sections 52.

It is believed that the construction and operation, as well as the many advantages of my improved light-reflecting and sound-transmitting motion picture screen, will be apparent from the foregoing detailed description thereof. A perforated screen is in itself not a desirable thing because the perforations reduce the strength of the screen and form dust-collecting orifices which in time become clogged and tend to dirty the screen. Because of the reduction in strength, the thickness of the screen must be increased, but this in turn affects not only cost but sound transmission. Thus, in prior practice, it has been customary to employ perforations which are fifty-thousandths of an inch in diameter, these perforations being forty-two to the inch, thus providing a 9% area of perforation, and in such case the minimum screen thickness has been fifteen thousandths of an inch. Because of the perforations, there is also a substantial reduction in the light-reflecting area, and it is for this reason that it has been found impractical or undesirable to increase the area of perforations to more than 9% of the total screen area. In accordance with the present invention, the screen is imperforate, thus overcoming all of the foregoing disadvantages. The screen may, of course, be porous, but this is not necessary, and it may be both imperforate and non-porous. The material of the screen is increased in strength and may be reduced in thickness to, say, ten thousandths of an inch.

Nevertheless, the effectiveness of sound transmission is in no way decreased, for the low frequency tones are efficiently transmitted through the imperforate screen. At the same time, the transmission of the higher frequency tones may actually be improved because of the greater freedom provided in the selection of hole diameter, area of perforation, hole distribution, and the like. For example, the perforate area may be increased as high as 20%, thus reducing the loss in the transmission of sound therethrough. Inasmuch as the reflecting and non-reflecting portions of the screen are sewed together by ordinary seams, there is no interference in sound wave distribution in back of the screen. The over-all result of the arrangement is the reproduction of sound waves with an improved linearity of response.

It will be understood that the border or mask sections may be provided with holes without perforating a previously imperforate sheet. For example, I have used sheets woven with perforations therein, and fabrics woven by spaced bands of threads, leaving square or rectangular openings therebetween. In this specification, therefore, I employ the term "perforated" to mean the existence of holes or apertures, regardless of how produced. I employ "perforated" and "perforate" as synonymous.

It will be apparent that while I have shown and described my invention in preferred forms, many changes and modifications may be made in the structures disclosed, without departing from the spirit of the invention, defined in the following claims.

I claim:

1. A light-reflecting and sound-transmitting motion picture screen comprising a light-reflecting imperforate non-porous screen material for picture reflection, said material having a weight and thickness selected to effectively transmit low frequency sound waves, and additional non-reflecting material outside of the reflecting material, said non-reflecting material being perforated with a large number of small closely spaced perforations for sound transmission, said non-reflecting material being so selected and perforated as to effectively transmit high frequency sound waves, said non-reflecting and reflecting materials being seamed together in such a manner as not to cause interference in sound waves across the back of the screen.

2. A light-reflecting and sound-transmitting motion picture screen comprising a light-reflecting imperforate non-porous screen material for picture reflection, said material having a weight and thickness selected to effectively transmit low frequency sound waves, and additional black non-reflecting material outside of the reflecting material, said non-reflecting material being perforated with a large number of small closely spaced perforations for sound transmission, said non-reflecting material being so selected and perforated as to effectively transmit high frequency sound waves, said non-reflecting and reflecting materials being seamed together by lines of stitching in such a manner as not to cause interference in sound waves across the back of the screen, the non-reflecting material acting as a mask to mask and outline the picture projected on the light-reflecting screen.

ALBERT E. HURLEY.